United States Patent [19]

Klinner

[11] 4,448,014
[45] May 15, 1984

[54] APPARATUS FOR CUTTING CROP

[75] Inventor: Wilfred E. Klinner, Milton Keynes, England

[73] Assignee: National Research Development Corporation, London, England

[21] Appl. No.: 369,012

[22] PCT Filed: Aug. 6, 1981

[86] PCT No.: PCT/GB81/00159

§ 371 Date: Apr. 9, 1982

§ 102(e) Date: Apr. 9, 1982

[87] PCT Pub. No.: WO82/00563

PCT Pub. Date: Mar. 4, 1982

[30] Foreign Application Priority Data

Aug. 14, 1980 [GB] United Kingdom ............... 8026481

[51] Int. Cl.$^3$ .................. A01D 55/18; A01D 57/28
[52] U.S. Cl. ................................ 56/13.6; 56/157; 56/192; 56/DIG. 1
[58] Field of Search ............ 56/13.6, 13.7, 14.1, 56/192, 157, 503, DIG. 1, DIG. 13, DIG. 17, DIG. 19, 255, 295

[56] References Cited

U.S. PATENT DOCUMENTS

| 2,625,784 | 1/1963 | Kelsey . | |
|---|---|---|---|
| 3,389,539 | 6/1968 | Zweegers | 56/13.6 |
| 3,608,287 | 9/1971 | Gaertner . | |
| 3,974,630 | 8/1976 | Van der Lely | 56/16.2 |
| 3,977,165 | 8/1976 | Klinner et al. | 56/16.4 |
| 4,199,922 | 4/1980 | Van der Lely | 56/13.6 |
| 4,314,436 | 2/1982 | Van der Lely | 56/13.6 |

FOREIGN PATENT DOCUMENTS

| 1582249 | 7/1970 | Fed. Rep. of Germany . | |
|---|---|---|---|
| 1936054 | 1/1971 | Fed. Rep. of Germany . | |
| 2838372 | 3/1979 | Fed. Rep. of Germany | 56/13.6 |
| 1500062 | 11/1967 | France . | |
| 2260275 | 9/1975 | France . | |
| 2403010 | 4/1979 | France . | |
| 2454748 | 11/1980 | France . | |
| 7004883 | 4/1970 | Netherlands . | |

Primary Examiner—Robert Peshock
Assistant Examiner—John G. Weiss
Attorney, Agent, or Firm—Cushman, Darby & Cushman

[57] ABSTRACT

A crop cutting apparatus has two vertical axis rotary drum cutters 13, each having an upper rotor with a crop conveying surface 19 and a lower rotor carrying knives 21. Gears drive the upper and lower rotors at different angular velocities. The lower rotor has an annular rim 18 having an upper surface shaped to continue the outline of the conveying surface 19. The knives 21 protrude outwardly from beneath the rim 18 and rotate with the rim. A wiper brush 34 mounted on the conveying surface 19 projects outwardly over the rim 18 for lifting and transferring crop to the surface 19. The upper rotor may have conditioning brushes 35 for conveying crop and conditioning crop by relative movement between the brushes and the crop. The upper and lower rotors may be rotated in opposite senses to effect at least partial shear cutting.

16 Claims, 17 Drawing Figures

APPARATUS FOR CUTTING CROP

The present invention relates to apparatus for the cutting of crops especially, but not exclusively, grasses, and is concerned in some respects with apparatus for cutting and conditioning crop.

In some aspects the present invention is concerned with improved arrangements of combinations of crop conditioning devices with crop cutting devices. In other aspects, the present invention is concerned with improvements in crop cutting devices themselves.

Modern crop cutting devices are usually mowers of the rotary type which sever the crop by impact, using free swinging knives attached near the periphery of discs which may be used alone (disc mowers), or which may form lower skirts of vertical drums which assist in conveying the cut crop towards the rear of the machine (drum mowers). In each case the discs which support the knives serve to convey the cut crop to the rear. Knife tip speeds have to be in the broad range of 70 to 90 meters per second, to ensure clean cutting in most crops and conditions, where impact is used. At these speeds it has been found that the power requirement for conveying the crop by the discs is very considerable. In some aspects the invention is concerned with reducing the power requirement for cutting the crop and/or for conveying the cut crop.

In some aspects the present invention is concerned with improved arrangements of combinations of crop conditioning devices with crop cutting devices. Such a device is shown in a previously published U.S. Pat. No. 3,977,165 (Klinner et al) which shows a form of drum cutting in which the main upper rotor is driven at a different rate of rotation from a lower rotor which carries the cutting knives of the cutting device. In this arrangement, conditioning devices are provided on the upper surface of the crop conveying skirt of the upper drum rotor which is rotated at a different rate of rotation from the cutting knives. In practice a problem arises with such arrangement in that it is difficult to maintain the correct close vertical clearance of the two rotary components, especially when the disc diameter is large and foreign objects are present on the surface of the field. In some aspects the present invention seeks to provide a rotary cutting apparatus of an improved and simplified nature having regard to the drum cutters described in this U.S. patent specification.

In other aspects, the present invention is directed towards means for conditioning crops. Forage crops such as grasses which are surplus to immediate requirements are usually cut and field-dried to provide animal fodder, particularly hay or silage, for the feeding of animals when fresh forage crops are not available. In temperate, especially maritime climates, the crops are at risk between cutting and harvesting (i.e. the field exposure time) because the adverse effects of light and rain and micro-organism activity can produce appreciable nutrient and dry matter losses. Accordingly, it is important to minimize the field exposure time to reduce the risk of such losses. However, the crops cannot be harvested until they have dried to a sufficiently high dry matter content for safe storage as animal fodder. In the case of hay, a dry matter content of about 80% is usually required.

The speed at which surface and sap moisture evaporate from the cut crop during field exposure depends inter alia on the physical condition of the crop. The principal barrier to moisture loss is the cuticle and the layer of epicuticular wax on the crop surface, and it is now common practice in agriculture to mechanically treat the crop in order to damage this barrier. Such mechanical treatment, which may take the form of crushing, lacerating, bruising, splitting, bending or scuffing the stem and leaves of the crop, is known as "conditioning". A variety of conditioning devices have been used or proposed, for example, as in U.K. Pat. Nos. 588439 (Chilton), 662303 (Goodall), 1303970 (Bucher Guyer), U.S. Pat. No. 3,977,165 (Klinner et al) and PCT published application No. PCT/GB79/00053—publication No. WO 79/00863 (BSRAE). The earlier of the devices described in these publications would often cause undesirable deep tissue damage to the crop resulting in high dry matter and nutrient losses, and were also unsatisfactory when attempts were made to condition a wide swath of crop, as the complexity and weight of machines increased considerably with width. The form of conditioning described in the last of the specifications set out above has allowed considerable progress to be made in producing acceptable conditioning with a light and relatively inexpensive conditioning device, and the present invention is concerned in some aspects, although not exclusively, with improvements in relation to the form of conditioning described and claimed in the said PCT patent application.

Another factor which affects the amount of time the crop lies in the field after cutting is the number of passes required to cut and condition the crop. In some cases, the crop requires three or more passes, including cutting, conditioning the crop after it has fallen to the ground, and finally tedding to restructure the swath so that it maintains a fast drying rate. Many proposals have been made in the past for reducing the number of passes by combining cutting and conditioning in a single machine, and such combined machines are described, inter alia, in the PCT application numbered above. In another aspect, the present invention is particularly concerned, although not exclusively, with apparatus for carrying out in a single pass the cutting and conditioning operation. In this connection the present invention is concerned in its main aspects with cutting and/or conditioning crop by rotary movement about a vertical axis. Such cutting and conditioning by rotary movement about a vertical axis is known in itself, for example in the U.K. Pat. No. 1303970 (Bucher Guyer), U.S. Pat. No. 3,977,165 (Klinner et al) and PCT application No. PCT/GB79/00053 (BSRAE) mentioned above. In the U.K. Specification No. 1303970 (Butcher Guyer) the conditioning rotor is described, inter alia, as a vertical "squirrel-cage" type of rotor rotating behind a vertical axis drum mower, whereas in the U.S. Pat. No. 3,977,165 (Klinner) the conditioning devices are described as conditioning elements mounted on the upper surface of the crop conveying skirt of a vertical axis drum mower. The PCT application No. PCT/GB79/00053 (BSRAE) mentions the possibility of two counter-rotated brushes fitted vertically so as to cover the opening between the drum of two-drum mowers to give a simple swath-forming arrangement. The brushes are described as being cylindrical or conical.

In a first aspect according to the present invention there is provided crop cutting apparatus comprising one or more crop cutting devices for cutting crop by rotary motion about a vertical axis, the or each crop cutting device comprising a first rotor and a second rotor, the first and second rotors being mounted for rotation about a common vertical axis, the first rotor having one or more cutting means for cutting crop by rotation of the first rotor, and the second rotor providing a crop conveying surface for conveying cut crop to the rear of the apparatus by rotation of the second rotor, and drive means for driving the first and second rotors in rotation at different angular velocities such as to effect cutting of crop by the cutting means and conveying of crop by the conveying surface, in which the or each cutting means is mounted on the first rotor at an attachment region outside the periphery of the crop conveying surface of the second rotor.

By the term different angular velocities is meant that the first and second rotors of each cutting device are rotated with different angular rates of rotation and/or in different directions of rotation.

The invention finds particular advantage where the or each cutting means is mounted on the first rotor by a pivoted mounting means allowing pivoting of the cutting means about a pivot axis outside the periphery of the crop conveying surface of the second rotor.

Preferably the or each cutting means is mounted on the first rotor by a mounting means having an upper surface positioned outside the periphery of the crop conveying surface of the second rotor and closely adjacent to that surface and most preferably the or each cutting means is arranged to protrude outwardly from beneath the upper surface of the mounting means.

Also it is preferred that the upper surface of the or each mounting means has at least a part thereof shaped to continue the general outline of the crop conveying surface of the second rotor at least at the transition region between the said upper surface and the said crop conveying surface, preferably the cutting means being arranged to protrude outwardly from, or outwardly from beneath, the said upper surface.

In some preferred arrangements, the said upper surface of the mounting means comprises an annular rim coaxial with and surrounding an outer edge of the crop conveying surface of the second rotor. Conveniently the crop conveying surface of the second rotor is a conventional outwardly extending and downwardly inclined frusto-conical or inverted-dish shaped surface, and the annular rim continues the outwardly extending and downwardly inclined conveying surface of the second rotor.

Alternatively, instead of a continuous annular rim, the first rotor may have a plurality of said upper surfaces, and each said upper surface may be provided by a discrete projecting portion projecting outwardly beyond the outer edge of the second rotor, each projecting portion having a cutting knife mounted to protrude outwardly from, or outwardly from beneath, the projecting portion.

In one arrangement the or each said upper surface may, over at least a portion thereof, be inclined to the horizontal in the direction of peripheral movement of the first rotor in such a manner as to form a ramp acting to lift cut crop towards the conveying surface of the second rotor.

In accordance with another convenient feature of the invention the second rotor includes one or more resilient wiper devices projecting outwardly beyond the periphery of the crop conveying surface of the second rotor for lifting and transferring crop to the crop conveying surface of the second rotor, or otherwise engaging crop. Preferably the resilient wiper device or devices extends outwardly over the cutting path of the cutting means.

In accordance with another feature of the invention the drive means may be arranged to drive the first and second rotors in opposite senses in such a manner that the cutting by the cutting means is at least in part shear cutting effected by the action of the two rotors in opposite directions on the crop.

The present invention finds particular usefulness where each second rotor is provided with a crop conditioning device for engaging crop and for conditioning the crop by the rotary movement of the second rotor.

There is also provided in accordance with the invention crop cutting apparatus comprising one or more crop cutting devices for cutting crop by rotary motion about a vertical axis, the or each crop cutting device comprising a first rotor and a second rotor, the first and second rotors being mounted for rotation about a common vertical axis, the first rotor having cutting means for cutting crop by rotation of the first rotor, and the second rotor providing a crop conveying surface for conveying cut crop to the rear of the apparatus by rotation of the second rotor, and drive means for driving the first and second rotors in rotation at different angular velocities such as to effect cutting of crop by the cutting means and conveying of crop by the conveying surface, in which the first rotor has an upper surface or surfaces positioned outside the periphery of the crop conveying surface of the second rotor and closely adjacent to that surface, the cutting means being arranged to protrude outwardly from, or outwardly from beneath, the said upper surface or surfaces of the second rotor.

In accordance with the present invention in a further aspect there is provided crop cutting apparatus comprising one or more crop cutting devices for cutting crop by rotary motion about a vertical axis, the or each cutting device comprising a first rotor and a second rotor, the first and second rotors being mounted for rotation about a common axis, the first rotor having cutting means for cutting crop by rotation of the first rotor, and the second rotor providing a crop conveying surface for conveying cut crop to the rear of the apparatus by rotation of the second rotor, and drive means for driving the first and second rotors in rotation at different angular velocities such as to effect cutting of crop by the cutting means and conveying of crop by the conveying surface, in which the second rotor includes one or more resilient wiper devices projecting outwardly beyond the periphery of the crop conveying surface for transferring crop to the crop conveying surface of the second rotor or otherwise engaging crop.

The resilient wiper device or devices may extend merely over an upper surface or surfaces of the first rotor, or may extend outwardly over the cutting path of the cutting means.

In accordance with the present invention in a yet further aspect there is provided crop cutting apparatus comprising one or more crop cutting devices for cutting crop by rotary motion about a vertical axis, the or each cutting device comprising a first rotor and a second rotor, the first and second rotors being mounted for rotation about a common axis, the first rotor including cutting means for cutting crop by rotation of the first rotor, and the second rotor comprising crop conveying means for conveying cut crop to the rear of the apparatus by rotation of the second rotor, and drive means for driving the first and second rotors in rotation in opposite senses in such a manner that the cutting by the cutting means is at least in part shear cutting effected by the action of the two rotors in opposite directions on the crop, the effect being particularly applicable when a wiper device or devices extend from the second rotor outwardly over the cutting path of the cutting means.

It is to be appreciated that any or all of the aspects of the present invention set out above may be combined to provide various preferred and convenient arrangements of cutting apparatus in accordance with the invention.

In accordance with another feature of the invention, in any of the aspects set out above, each second rotor may be provided with a crop conveying and conditioning device for engaging crop for the purpose of conveying it and for conditioning the crop by relative movement between the conditioning device and the crop engaged thereby, the crop conditioning device comprising a plurality of conditioning elements directed outwardly from the axis of rotation of each of the said second rotors.

Conveniently the conveying and conditioning device with which the second rotor is provided may be a conditioning device comprising a brush-like structure having a multiplicity of stiff, resilient, elongate conditioning elements for conditioning the crop by a spiking and/or stiff brushing action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with the crop at least predominantly by virtue of the stiffness of the elements. Such a conditioning device may conveniently be of the kind set out in our published copending patent application PCT/GB79/00053 (WO 79/00863) referred to above.

With reference to crop cutting and conditioning devices referred to above as described in U.S. Pat. No. 3,977,165 (Klinner et al), the present invention represents in a number of aspects improvements over the devices previously described. Work at the National Institute of Agricultural Engineering at Wrest Park, Silsoe, Bedford, England in the last 1960s had shown that the knife carrying discs of rotary mowers, both of the drum and disc type, could be fitted with conditioning attachments in such a way that their mowing performance was not impaired and the action of the attachments imparted to the crop a conditioning treatment simultaneous with the cutting. The effectiveness of the various attachments, all made of steel, was good, but there were two serious disadvantages. Firstly, a significant percentage of crop was too severely treated so that dry matter losses would become rather high. Secondly, any stones or other heavy objects which were picked up by the mower were projected at times in a hazardous manner. The arrangement shown in FIG. 24 of U.S. Pat. No. 3,977,165 was intended to attempt to overcome these difficulties by providing a slower rate of rotation of the upper drum rotor than the lower knife carrying disc. However, from the engineering point of view, it is difficult to construct a rotary mower (particularly of large diameter disc type as used in modern drum mowers) in such a way that in the hostile environment of typical grass fields, the small clearance between the upper and lower discs and the pivoted knives is maintained, and the step which cut crop has to climb onto the conveying surface does not constitute so great an obstacle that the power requirement of the machine is drastically increased. In preferred arrangements of the present invention, it is possible to provide rotary mowers on which the cutting knives are driven at the optimum speed for impact cutting, i.e. between approximately 70 and 95 m/s, but the crop conveying discs are driven at a very much lower speed, so that resilient conditioning devices attached to them will neither fragment the crop excessively nor propel foreign objects dangerously. Furthermore, and most importantly, the risk of collision between metal components can be arranged to be minimal.

Embodiments of the invention will now be described by way of example with reference to the accompanying drawings in which.

Figure 1:
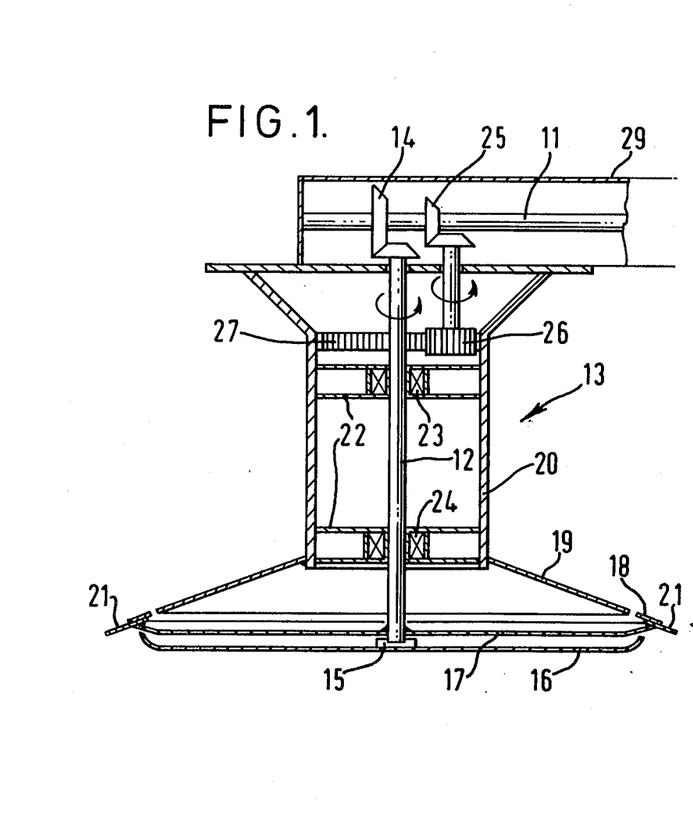
FIG. 1 is a cross-section showing from the front the outer half of a twin unit, two-speed crop cutting apparatus embodying the invention, but generally of the drum mower kind.

FIG. 1 is a cross-section showing from the front the outer half of a twin unit, two-speed crop cutting apparatus embodying the invention and generally of the drum mower kind. From a transverse drive shaft 11 a centre spindle 12 of the drum cutter indicated generally at 13 is driven by means of two bevel gears 14. At its base the spindle 12 runs in a thrust bearing 15 and has attached to it a skid disc 16 which is freely rotatable in known manner. Above the skid disc 16 there is fixedly attached to the spindle 12 a support disc 17 which constitutes a first, lower rotor of the cutting device and which carries a narrow frusto-conical rim 18 which may for example be 50 mm wide. The shape of the rim 18 is such that its sloping upper surface is a continuation of the shape of a crop conveying skirt 19 attached to the base of the central drum 20 of the cutting device 13. Pivoted knives 21 are attached to the underside of the narrow rim 18 in such a way that upon meeting an obstruction each knife can swing through 360°. The knife carrying rim 18 is entirely smooth on its crop facing surface and may for example be coated with polytetraflouroethylene or other durable low friction material. At the position of each knife 21, recesses in the disc 17 allow the knife to pivot underneath the rim 18, through 360°, upon striking an obstruction on the ground.

The drum 20, skirt 19 and internal supporting webs 22 constitute a second, upper rotor which is mounted by bearings 23 and 24 on the central spindle 12, and is driven from the transverse shaft 11 at the top by a second pair of bevel gears 25 and through a gear wheel 26 and internal gear ring 27. The speed at which the upper rotor 19-20, is driven may for example be 20 m/s at the circumference of the crop conveying skirt 19, but may in other cases be in the range 10 m/s to 40 m/s. As shown in FIG. 1 by the two arrows, both the knife carrying rim 18 and the crop conveying skirt 19 rotate in the same direction, namely towards the rear on the inner side of the cutting device 13 which faces towards the other cutting device (not shown). Thus in conventional manner the crop is gathered inwardly between the two cutting devices and transferred rearwardly to form a swath. Thus on the second cutting device (not shown) the rotating components revolve in the opposite direction so that the crop is conveyed to the rear through the central space between the adjacent devices.

Figure 2:
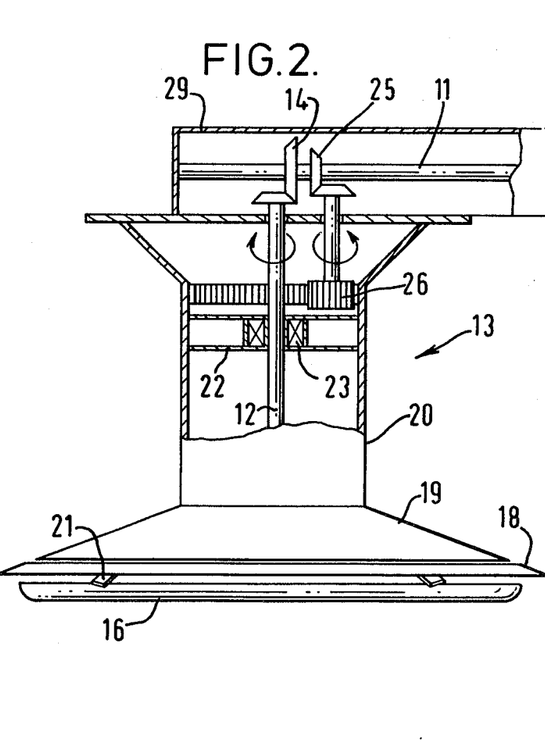
FIG. 2 is a front view partly in cross-section of a modified form of the crop cutting apparatus of FIG. 1.

FIG. 2 is a front view partly in cross-section of a modified form of the crop cutting apparatus of FIG. 1, and in this and other embodiments corresponding elements are indicated by like reference numerals. In this modification the bevel gears 14 and 25 are so arranged that the knife carrying rim 18 rotates in the opposite direction to the direction of rotation of the crop conveying skirt 19.

With regard to the gearing shown in FIGS. 1 and 2, it will be appreciated that alternative ways of achieving the differential drive may be provided, such as planetary gearing.

It is not essential that the cutting rotor rotates more quickly than the conveying and conditioning rotor. If a method is used with achieves the desired crop cutting at lower speeds than the lowest effective conditioning speeds of, say, 15 m/s, then the ratio of the speeds between cutting and conditioning components may be reversed.

Figure 3:
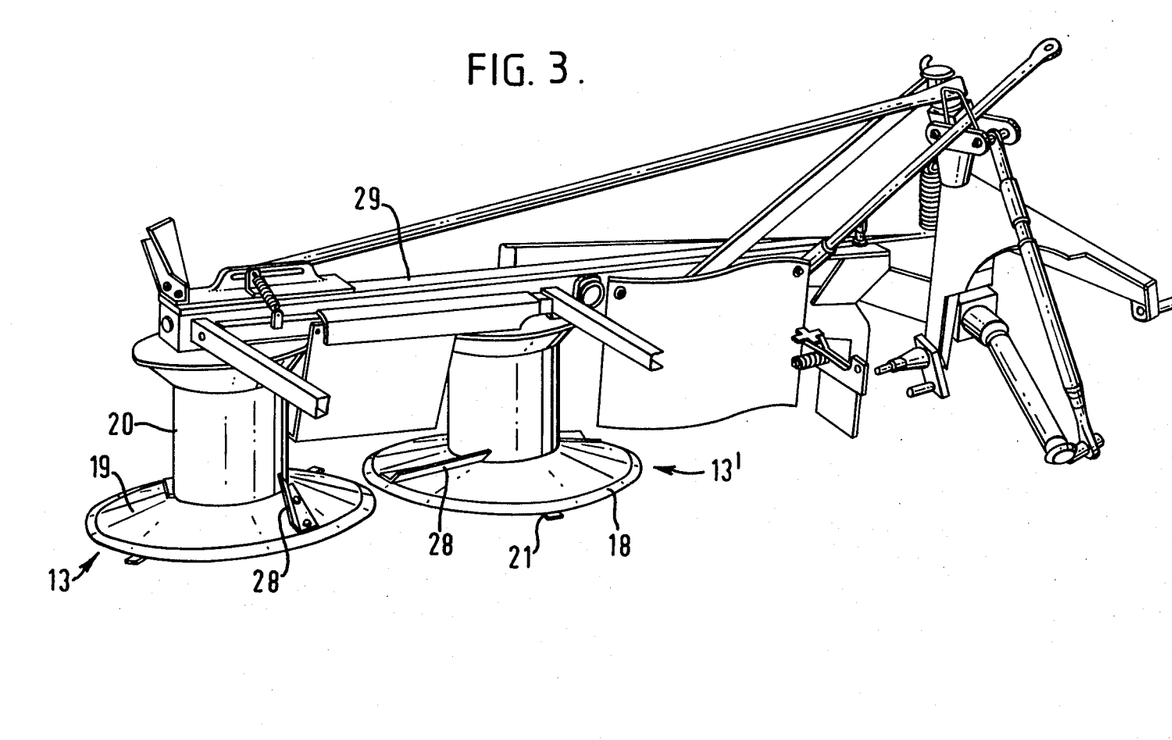
FIG. 3 is a diagrammatic perspective view of the general layout of a crop cutting apparatus embodying the present invention as shown in the preceding Figures, but with support for crop conveying and/or conditioning devices attached.

FIG. 3 is a diagrammatic perspective view of the general layout of crop cutting apparatus embodying the invention in the form shown in FIG. 1 or FIG. 2, but with attachments 28 attached to the upper surfaces of the crop conveying skirts 19. The attachments 28 are support bars intended for mounting crop conveying and/or conditioning elements to be described and shown hereinafter. The two crop cutting devices are indicated generally at 13 and 13' and are shown as supported from an overhead fram 29 suitable for attachment to the three point linkage of a tractor.

Figure 4:
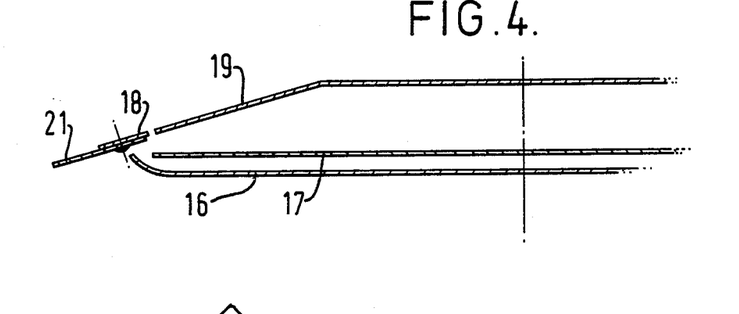
FIGS. 4 and 5 are side and plan diagrammatic representations respectively of a modification of a crop cutting apparatus of the form shown in the preceding Figures.
Figure 5:
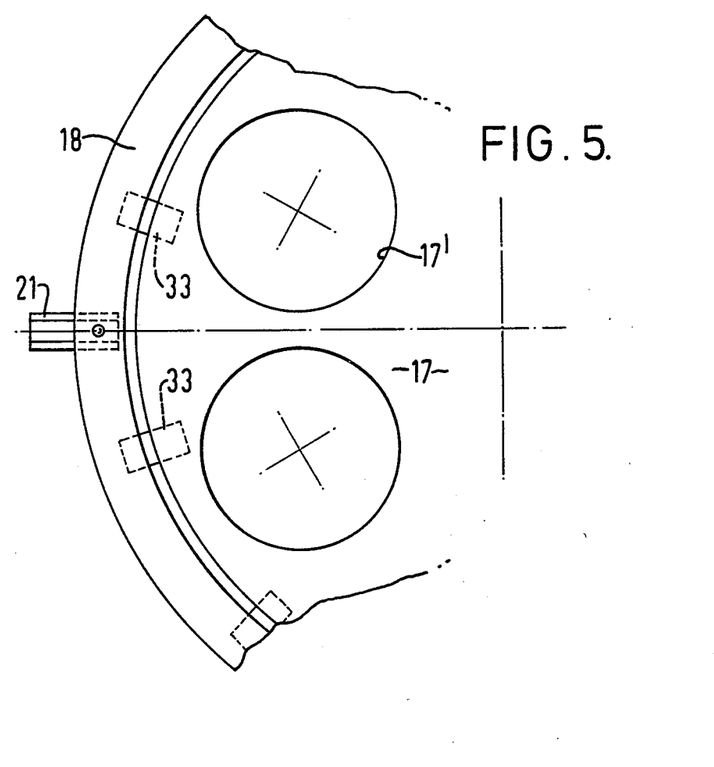

FIGS. 4 and 5 are side and plan diagrammatic representations respectively of a modification of the crop cutting apparatus of the form shown in the preceding figures, and again corresponding elements are indicated by the like reference numerals. FIG. 4 shows the skid disc 16 at the base of the cutting device, and a disc 17 which carries the outer rim 18 and knives 21.

FIG. 5 shows how the knife carrying rim 18 is attached to the support disc 17 by means of spaced apart angled brackets 33. This method of construction ensures that any material which may enter through the gap between the knife carrying rim 18 and the crop conveying skirt 19 can leave again through the gaps between brackets 33 under the influence of centrifugal forces. The plan view in FIG. 5 shows how the pivoted knives 21 can rotate through 360°, between the brackets 33.

Figures 6, 6A:
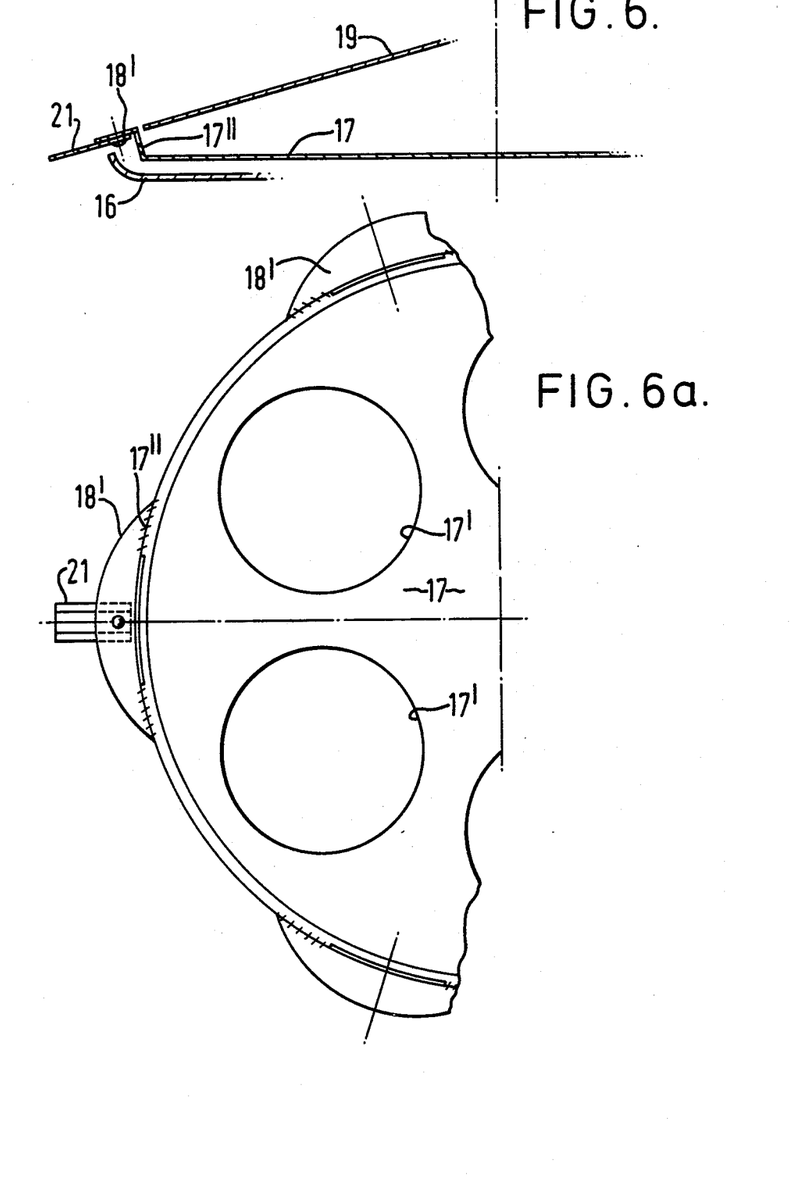
FIGS. 6, and 6(a); 7 and 7(a); and 7(b) and 7(c) are diagrammatic side and plan views respectively of further modifications of the crop cutting apparatus shown in the preceding Figures, in which a lower rotor includes discrete projecting portions.

FIGS. 6 and 6(a) are diagrammatic side and plan views respectively of a further modification of the crop cutting apparatus shown in the preceding figures, in which the lower support disc 17 consists of a dished pressing from which smaller discs have been cut as indicated at 17' to save weight. To provide locating and mounting means for the knives 21, part-moon shaped plates 18' are welded to an upstanding rim 17" which is also recessed at the top to allow each knife to swing through a full 360°, on impact with a heavy object. In this modification, the projections 18' fulfill a similar function to the rim 18 in the preceding figures, and as shown in FIG. 6, the shape of each projection 18' is such as to continue the shape of the upper surface of the crop conveying skirt 19. In a modified version shown in FIGS. 7 and 7(a), each plate is in the form of a ramp acting to lift cut crop towards the conveying surface 19 of the upper rotor.

Although it is preferred that the knives 21 are mounted beneath the projections 18', or the rim 18, it is to be appreciated that the knives could be mounted on top of the projections 18' or rim 18. Furthermore, the knives could be fixedly or semi-rigidly mounted without pivotting.

Figure 7:
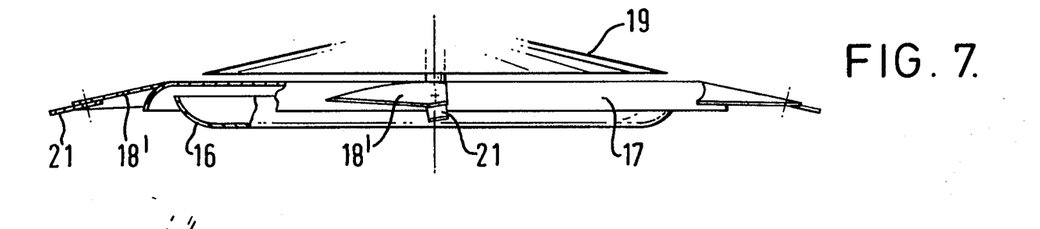
Figure 7A:
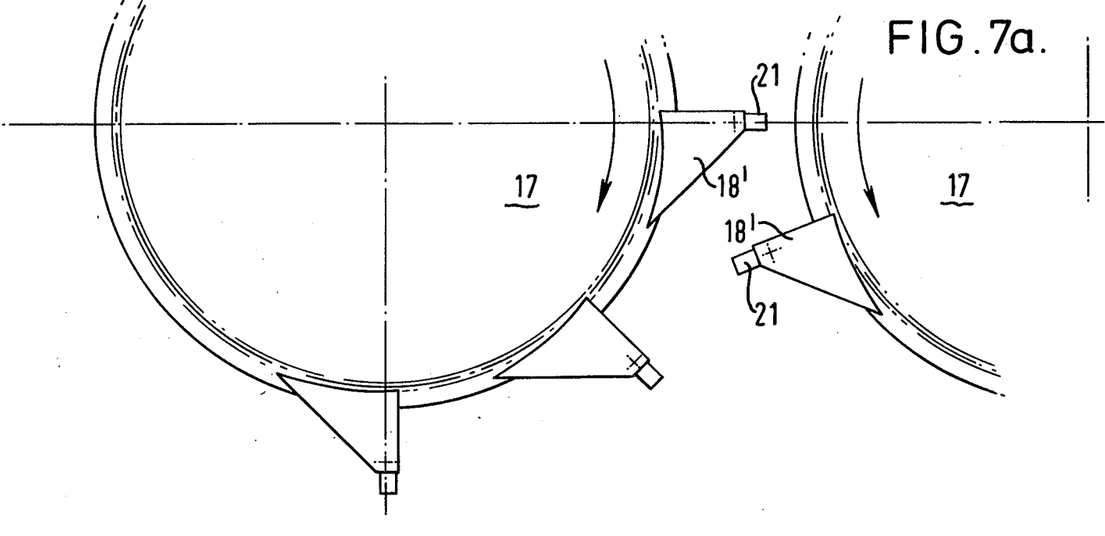

The embodiments of FIGS. 6 and 7 give the advantage that the overlap zone between two adjacent, counter rotating and synchronously driven cutting units can be made greater than is possible with plain disc units. As a result the "mane" of long stubble so often left in difficult crops and conditions by rotary mowers is avoided.

It should be understood that the shape of the ramp-like protrusions in FIGS. 6, 6(a), 7 and 7(a) can be varied; the most preferred shape is the leading half of a part-moon, as in FIG. 6(a).

Figure 7B:
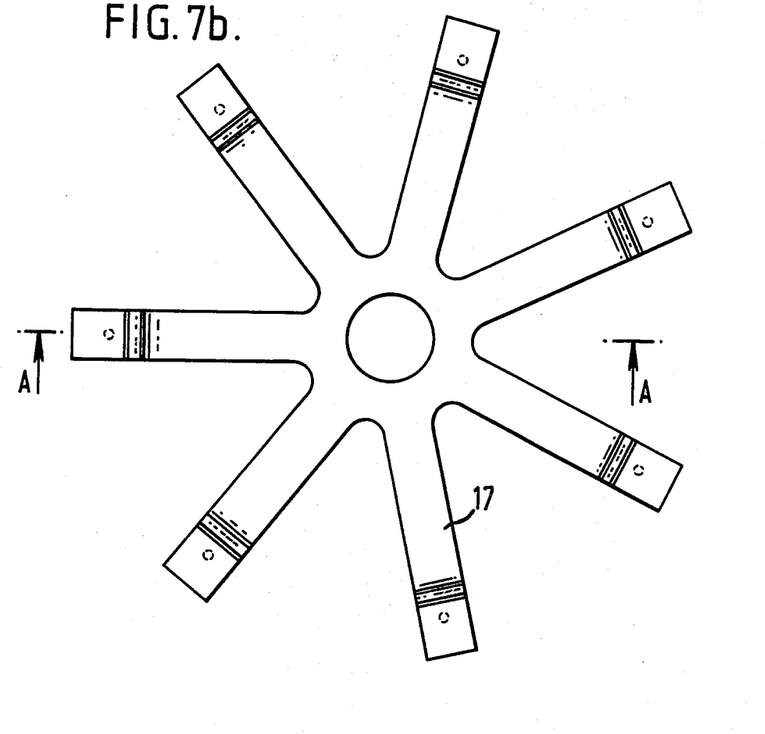
Figure 7C:
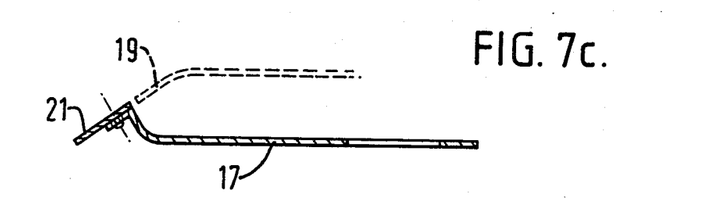

In FIG. 7(b) there is shown in plan view an alternative form of the rotor 17 for supporting the knives 21, although in FIG. 7(b) the knives are omitted. FIG. 7(c) is a cross-section along the lines A—A in FIG. 7(b), and shows one of the knives 21, and also the relationship of the rotor 17 to the conveying rotor surface 19. Thus in general it will be appreciated that the cutting knives can be attached to upturned or downturned spoke-like extensions of a lower rotor of small centre diameter, in such a way that the upper surface of each knife lies approximately in the continuation plane of the crop conveying surface of the upper rotor.

Figure 8:
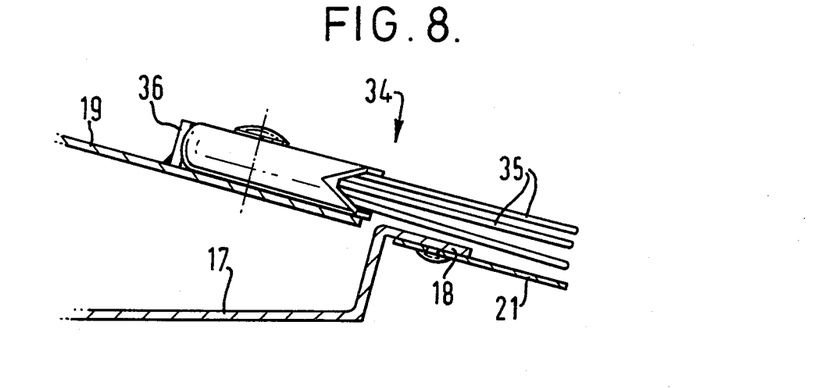
FIGS. 8 and 8(a) show a side cross-section and plan view respectively of a crop cutting apparatus embodying the present invention and suitable for use in connection with crop cutting apparatus shown in the preceding Figures.
Figure 8A:
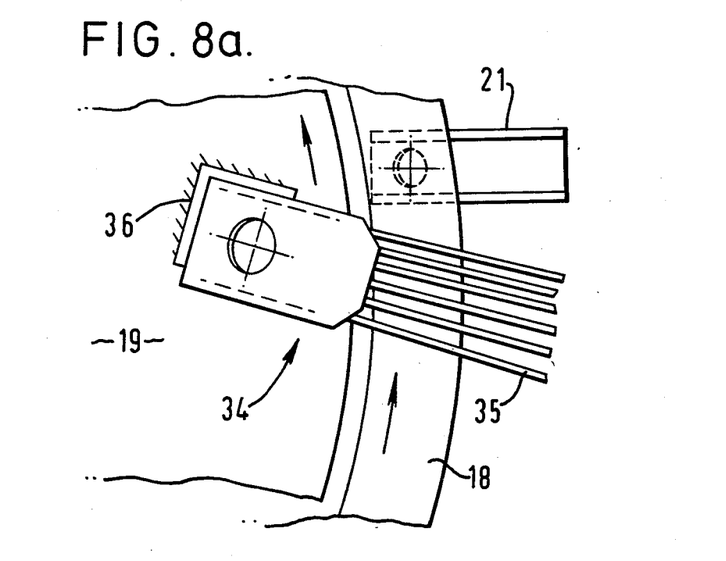

FIGS. 8 and 8(a) show a side cross-section and plan view respectively of an apparatus embodying the present invention and suitable for use in connection with the crop cutting apparatus shown in the preceding figures. FIG. 8 shows a wiper device 34 in the form of a tuft of resilient crop conditioning elements (also referred to as filaments) 35 formed of synthetic plastics material. The tuft 34 is bolted onto the crop conveying skirt 19 in such a way that it is supported on two sides by a shallow bracket 36 to prevent the tuft from turning under the influence of centrifugal force or load applied to its tip. In the plan view of FIG. 8(a), the tuft 34 is shown to be orientated in such a way that, relative to a radius of the crop conveying skirt 19, the tips of the elements 35 are trailing. It is also shown that the elements 35 overhang the knife carrying rim 18 and may extend over the cutting path of the cutting knives 21. The number of wiping tufts 34 fitted near the perimeter of the crop conveying skirt 19 may varied from two per disc to several times the number of cutting knives.

The wiper element of FIGS. 8 and 8(a) overhanging the cutting rim is not primarily for conditioning the crop; it also serves the purpose of engaging, lifting or assisting crop on to the conveying skirt and prevents repeated contact of crop with the cutting knives. Optionally it can intrude into the cutting zone. The degree of resilience and its construction can vary.

Figure 9:
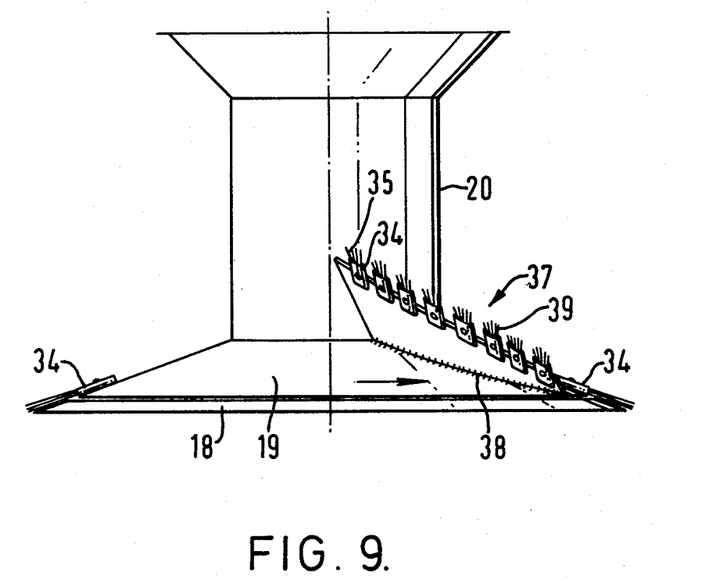
FIG. 9 is a diagrammatic side view of crop cutting and conditioning apparatus embodying the invention in which an array of conditioning elements is provided on an upper rotor of a crop cutting device.

FIG. 9 is a diagrammatic side view of a crop cutting and conditioning apparatus embodying the invention and is particularly concerned with a linear array 37 of crop conditioning elements 35 which are provided on the crop conveying skirt 19 of a crop cutting and conditioning device 13. FIG. 9 shows a knife carrying rim 18 of the form described with reference to the previous figures, and also shows a tuft 34 protruding out over the rim 18. The rim wiping tuft 34 is shown to be followed by an attachment to the crop conveying skirt 19 which consists of a rearwardly leaning bracket plate 38 to which are attached on the upwardly inclined trailing face thereof a series of tufts 39 of synthetic plastics conditioning elements 35 similar to the elements described with reference to FIG. 8(a). The conditioning elements of the embodiments described with reference to FIG. 8 onwards of the present description may conveniently be of any of the forms described in published pending PCT Application No. PCT/TB79/00053—Publication No. W079/00863. It is an object of the attachment shown in FIG. 9 as a whole to drive itself under the cut crop, forcing the crop upwards so that it is scratched and abraded by the tufts of plastics material during acceleration. To maintain the drum unit of the cutting device 13 in balance in operation, two attachments 38 are normally required, although alternatively a counter-weight may be fitted on the opposite side of the crop conveying skirt 19 and this may be appropriate on a relatively small diameter cutting device. Preferably the multi tuft attachment 37 is fitted at an angle to a radius of the vertical axis of the cutting device 13 so that the outer end of the attachment 37 leads the radius. The angle which the attachment 38 makes with a radius of the vertical axis of the cutting device 13 (when viewed from above) determines whether the crop is scattered at the rear of the mower or whether it is formed into a distinct swath. In FIG. 9 the inclination of the crop conveying skirt 19 has been accentuated by the base of the attachment 38 being tapered down towards the rim. This configuration makes it more difficult for the crop to move towards the centre of the crop conveying skirt 19, and conditioning is largely confined to the lower crop regions.

Figure 10:
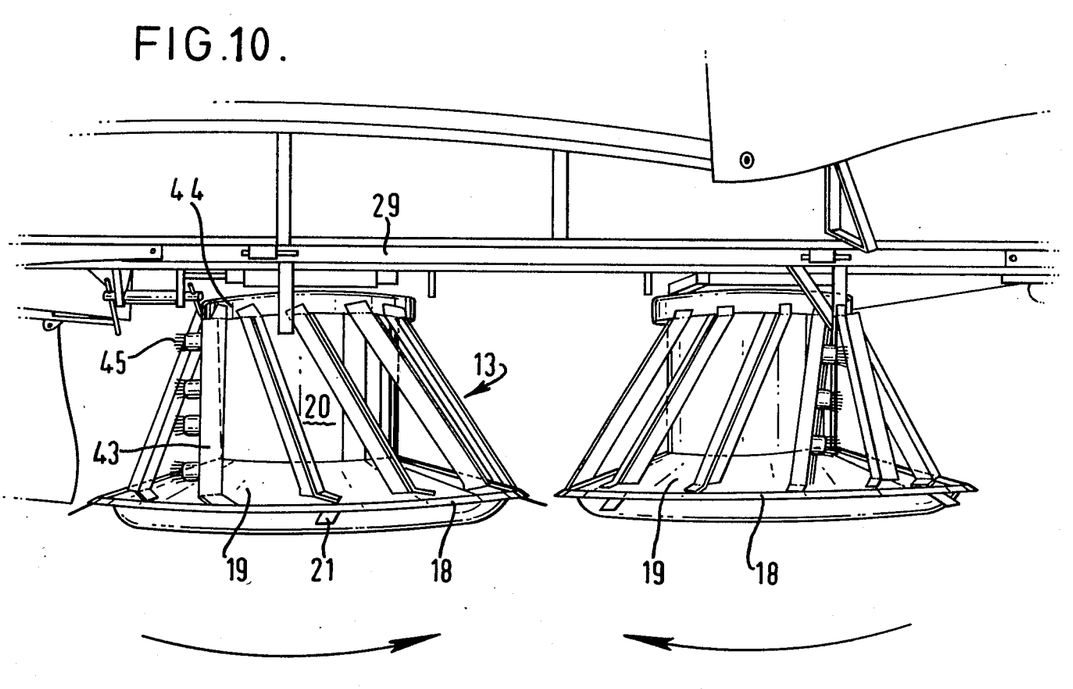
FIGS. 10 and 10(a) are diagrammatic perspective views of a crop cutting and conditioning device embodying the invention.
Figure 10A:
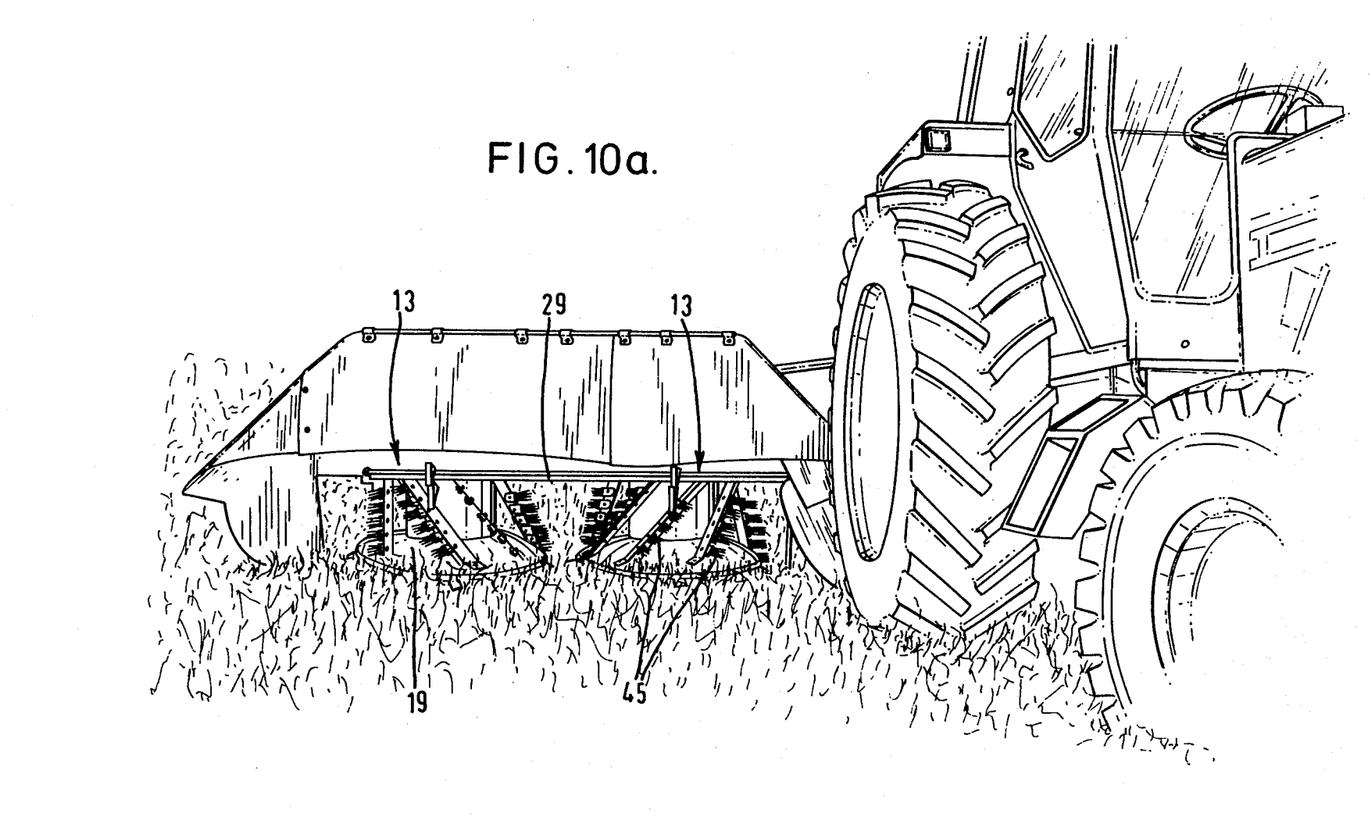
Figure 11:
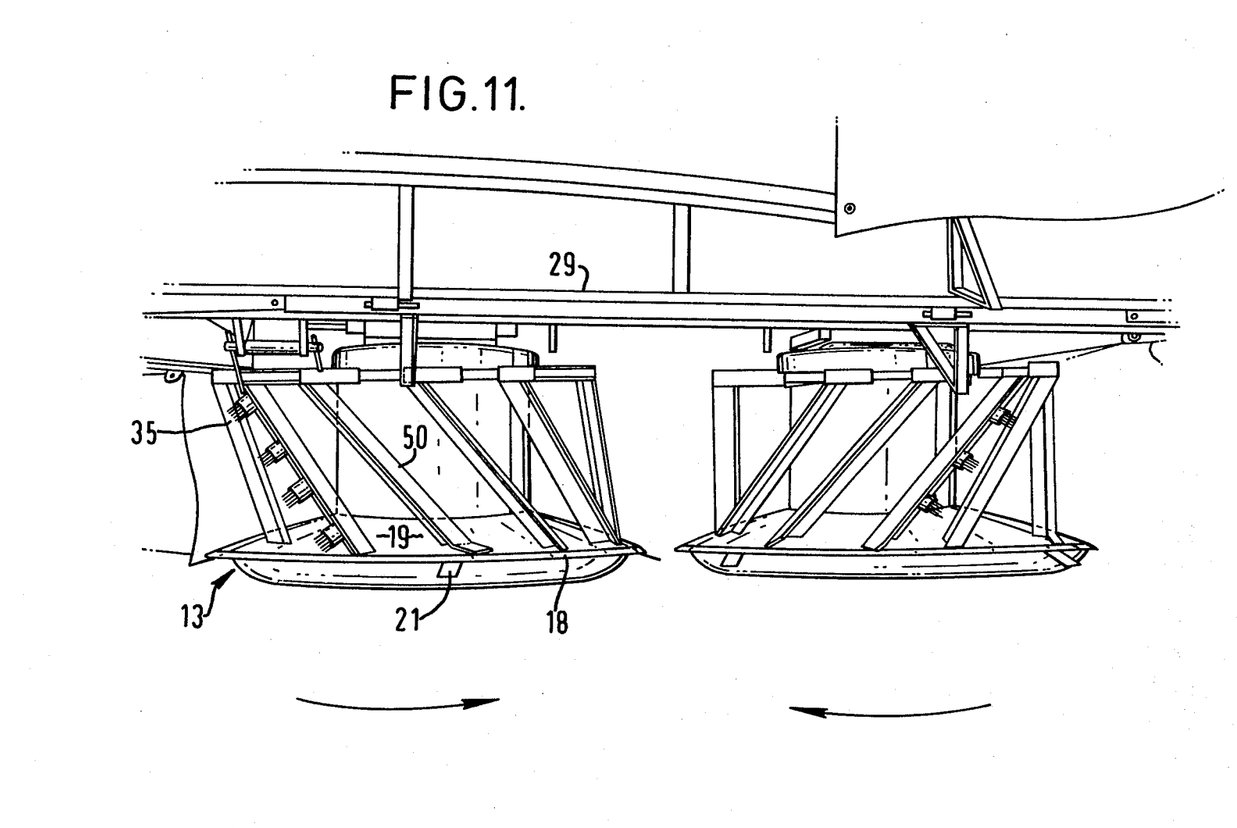
FIG. 11 is a diagrammatic perspective view of a modification of the crop cutting and conditioning device shown in FIG. 10.

FIGS. 10 and 10(a) are diagrammatic perspective views of a further embodiment of a crop conditioning device embodying the invention, in this case where conditioning elements are provided on bars 43 positioned to extend between the outer edge of the conveying skirts 19, and the upper part of the drum 20. The bars are arranged in the general form of a conical "squirrel cage" arrangement, and represent a further movement of the conditioning elements from the positions shown in FIG. 9, so as to be lying at an even steeper angle to the plane of the conveying skirt. The conditioning bars are so fitted that they connect the upper surface of the crop conveying skirt 19 with the underside of an upper ring 44 attached to the top of the drum 20. In FIG. 10, brush tufts 45 are shown set substantially horizontally, whilst in FIG. 11 which shows a modification the tufts 45 are inclined downwardly in the outward direction. In FIGS. 10 and 11 the lower parts of the bars lead the upper parts, relative to the rotation of the rotors, forming a helical arrangement in order to give a lifting effect to the crop.

The crop conditioning unit need not necessarily be of open cage construction, but can consist of a solid cone or drum to which fins for mounting the conditioning elements can be attached.

Considering generally some of the advantages which may be obtained from the invention as embodied in the structures described, one principal advantage is that there can be provided resilient conditioning elements or devices which may be attached to components which rotate substantially more slowly about an axis than the knives which cut the crop. Amongst other advantages, there may be provided a conditioning rotor on which the angle of the conditioning elements is adjustable relative to a radius of the axis about which conditioning elements are rotated, so that crop may be treated at different levels of severity and may either be spread or arranged in distinct swaths. In some arrangements there may be advantage derived in respect of better cutting performance by arranging that the cutting knives and resilient wiper elements counter rotate in the same vertical plane giving the effect that crop stems are held positively by the resilient elements at the moment of impact with the knives. Thus in some arrangements a lower rotor carrying cutting elements may be rotated about a vertical axis in one sense, while an upper rotor carrying conditioning elements may be rotated about the same vertical axis but in the opposite sense.

It is to be appreciated that the wiper devices and conditioning elements may, in generality, be of alternative construction, for example by being resiliently mounted metal spokes or shaped fins.

I claim:

1. Crop cutting apparatus for cutting crop by rotary motion about a substantially vertical axis comprising:
    a first rotor,
    a second rotor, said first and second rotors being mounted for rotation about a common substantially vertical axis,
    said first rotor including at least one cutting means for cutting crop by rotation of the first rotor, and said second rotor including surface means extending from a peripheral edge separated by a gap from an adjacent edge of said first rotor and providing a crop conveying surface for conveying cut crop to the rear of the apparatus by rotation of said second rotor, said conveying surface forming an angle less than forth-five degrees to the horizontal, said first rotor also including mounting means for mounting said cutting means at an attachment region outside the edge of said surface means of said second rotor, and
    drive means for driving said first and second rotors in rotation at different angular velocities such as to effect cutting of crop by said cutting means and conveying of crop by said conveying surface,
    said drive means driving said rotors in rotation at said different angular speeds with a working clearance between said rotors to prevent contact between said first and second rotors at the periphery of said conveying surface of said second rotor, said gap between said first and second rotors at said periphery of said conveying surface of said second rotor extending between said edges in a direction forming an angle less than forty-five degrees to the horizontal.

2. Apparatus according to claim 1 in which said first rotor has an upper surface outside said edge of said surface means of said second rotor, said upper surface being closely adjacent to said conveying surface and being shaped to continue the general outline of said crop conveying surface of said second rotor at least at a transition region between said upper surface and said crop conveying surface.

3. Apparatus according to claim 1 in which said conveying surface of said second rotor is formed on a frusto-conical skirt forming part of said second rotor.

4. Apparatus according to claim 1 in which said cutting means comprise a plurality of outwardly extending cutting blades.

5. Apparatus according to claim 1 in which said cuting means is mounted on the first rotor by a pivoted mounting means allowing pivoting of the cutting means about a pivot axis outside the periphery of the crop conveying surface of the second rotor.

6. Apparatus according to claim 1 in which said cutting means is mounted on the first rotor by a mounting means having an upper surface positioned outside the periphery of the crop conveying surface of the second rotor and closely adjacent to that surface.

7. Apparatus according to claim 6 in which said cutting means is mounted to protrude outwardly from beneath the upper surface of the mounting means.

8. Apparatus according to claim 6 in which the upper surface of said mounting means has at least a part thereof shaped to continue the general outline of the crop conveying surface of the second rotor at least at the transition region between the said upper surface and the said crop conveying surface.

9. Apparatus according to claim 6 in which said upper surface of the mounting means comprises an annular rim coaxial with and surrounding an outer edge of the crop conveying surface of the second rotor.

10. Apparatus according to claim 6 in which said upper surface is, over at least a portion thereof, inclined to the horizontal in the direction of peripheral movement of the first rotor in such a manner as to form a ramp acting to lift cut crop towards the conveying surface of the second rotor.

11. Crop cutting apparatus according to claim 1 in which the second rotor includes at least one resilient wiper device projecting outwardly beyond the periphery of the crop conveying surface of the second rotor for lifting and transferring crop to the crop conveying surface of the second rotor.

12. Apparatus according to claim 11 in which the resilient wiper device or devices extends outwardly over the cutting path of the cutting means.

13. Apparatus according to claim 1 in which the said drive means is arranged to drive the first and second rotors in opposite senses in such a manner that the cutting by the cutting means is at least in part shear cutting effected by the action of the two rotors in opposite directions on the crop.

14. Apparatus according to claim 1 in which each second rotor is provided with a crop conditioning device for engaging crop and for conditioning the crop by the rotary movement of the second rotor.

15. Crop cutting apparatus for cutting crop by rotary motion about a substantially vertical axis comprising:
a first rotor, and
a second rotor, said first and second rotors being mounted for rotation about a common substantially vertical axis,
said first rotor including a plurality of outwardly extending cutting blades for cutting crop by rotation of the first rotor, and said second rotor including a frusto-conical skirt providing a crop conveying surface for conveying cut crop to the rear of the apparatus by rotation of said second rotor, said conveying surface forming an angle less than forty-five degrees to the horizontal,
said first rotor including mounting means for mounting said cutting blades at an attachment region outside the periphery of said crop conveying surface of said second rotor, said mounting means allowing pivoting of each cutting blade about a pivot axis outside said periphery of said crop conveying surface of said second rotor,
said mounting means having an upper surface outside said periphery of said conveying surface of the second rotor, said upper surface being closely adjacent to said conveying surface and being shaped to continue the general outline of said conveying surface of the second rotor at least at the transition region between said upper surface and said crop conveying surface, said cutting blades being arranged to protrude outwardly from beneath the upper surface of the mounting means, and
drive means for driving said first and second rotors in rotation at different angular velocities such as to effect cutting of crop by said cutting means and conveying of crop by said conveying surface,
said drive means driving said rotors in rotation at said different angular speeds with a working clearance extending between the peripheries of said rotors to prevent contact between said first and second rotors at the periphery of said conveying surface of said second rotor, said clearance between the first and second rotors at said periphery of said conveying surface being arranged to occur between said periphery of said conveying surface of said second rotor and said upper surface of said mounting means and to lie in a direction forming an angle less than forty-five degrees to the horizontal.

16. Crop cutting apparatus for cutting crop by rotary motion about a substantially vertical axis comprising:
a first rotor, and
a second rotor, said first and second rotors being mounted for rotation about a common substantially vertical axis,
said first rotor including at least one cutting means for cutting crop by rotation of the first rotor, and said second rotor including a frusto-conical skirt providing a crop conveying surface for conveying cut crop to the rear of the apparatus by rotation of said second rotor, said conveying surface forming an angle less than forty-five degrees to the horizontal;
said first rotor including mounting means for mounting said cutting means at an attachment region outside the periphery of said crop conveying surface of said second rotor, said cutting means having an upper surface outside the periphery of the said conveying surface of the second rotor, said upper surface being closely adjacent to said conveying surface and being shaped to continue the general outline of the crop conveying surface of the second rotor at least at a transition region between said upper surface and said crop conveying surface, and drive means for driving said first and second rotors in rotation at different angular velocities such as to effect cutting of crop by said cutting means and conveying of crop by said conveying surface, said drive means driving said rotors in rotation at said different angular speeds with a working clearance between said rotors to prevent contact between said first and second rotors at the periphery of said conveying surface of said second rotor, said clearance between the first and second rotors at said periphery of the conveying surface of said second rotor extending between said periphery of said conveying surface of said second rotor and said upper surface of said cutting means and lying in a direction forming an angle less than forty-five degrees to the horizontal.

* * * * *